March 21, 1967  M. S. PAPAZIAN  3,309,776
AUTOMOBILE WHEEL ALIGNMENT APPARATUS
Filed June 6, 1963  2 Sheets-Sheet 1
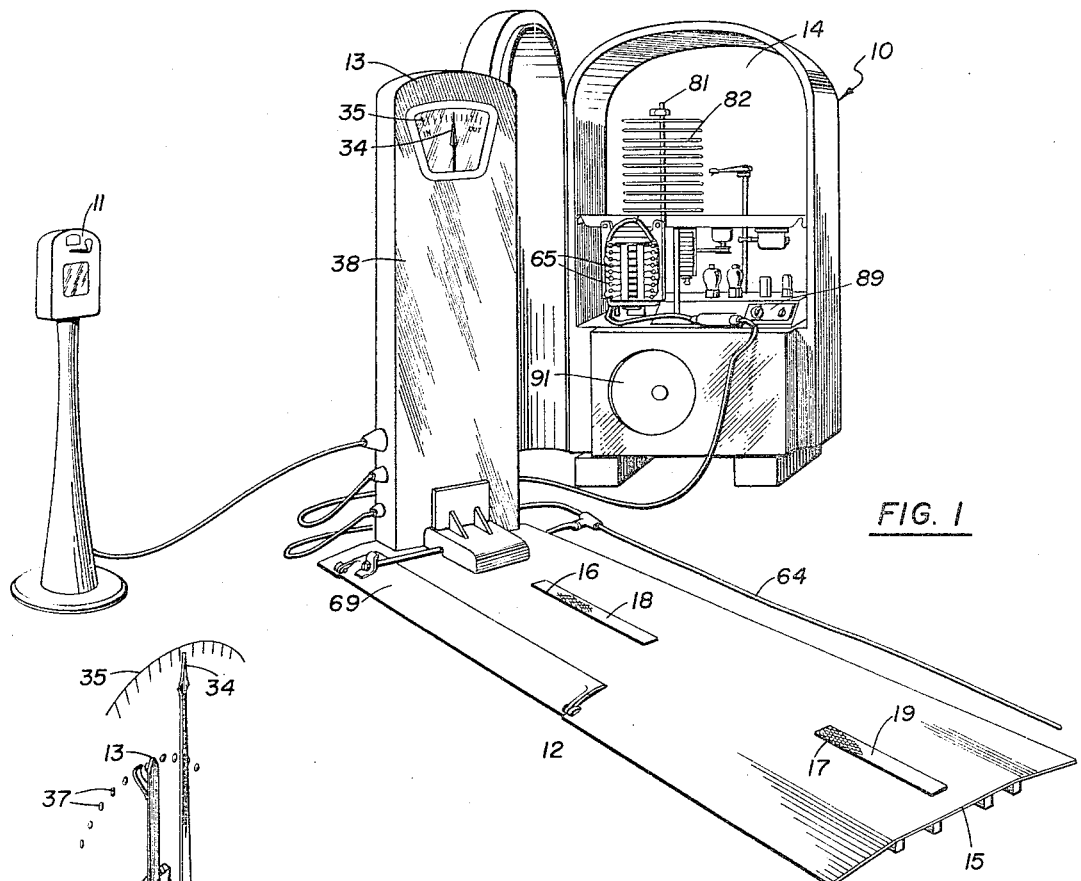
FIG. 1
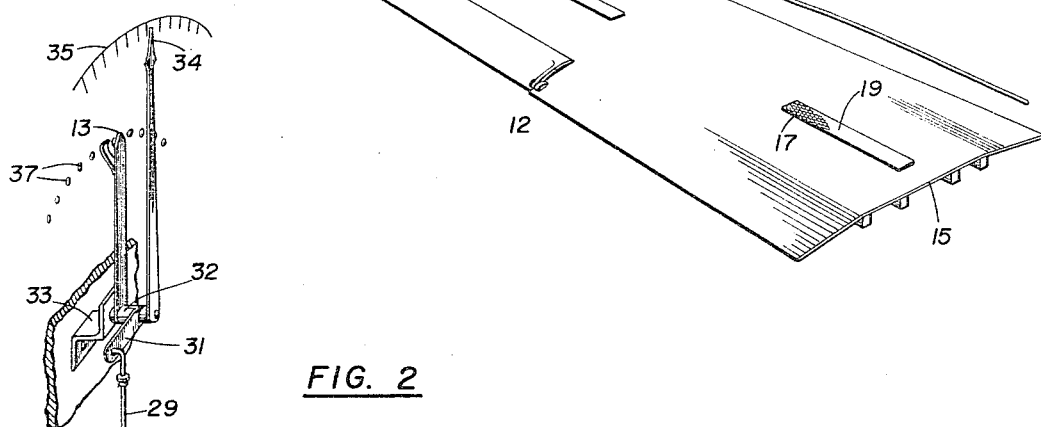
FIG. 2
MARTIN S. PAPAZIAN
INVENTOR.
BY
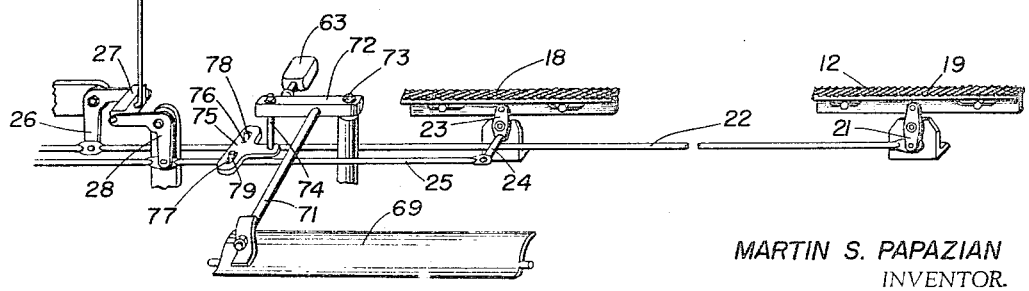

March 21, 1967   M. S. PAPAZIAN   3,309,776

AUTOMOBILE WHEEL ALIGNMENT APPARATUS

Filed June 6, 1963   2 Sheets-Sheet 2

MARTIN S. PAPAZIAN
INVENTOR.

United States Patent Office 3,309,776
Patented Mar. 21, 1967

3,309,776
AUTOMOBILE WHEEL ALIGNMENT
APPARATUS
Martin S. Papazian, 123 Moreland St.,
Worcester, Mass. 01609
Filed June 6, 1963, Ser. No. 286,022
3 Claims. (Cl. 33—203.14)

This invention relates to an automobile wheel alignment apparatus and, more particularly, to apparatus arranged to permit the owner of an automobile to determine the degree of alignment of the front wheels of his automobile without the necessity of a mechanic being present.

Although many mechanisms have been evolved for determining the alignment of automobile front wheels, particularly for determining the amount of "toe in" and "toe out" of the wheels, it has always been necessary for the operation to be carried out by a skilled mechanic. It has been necessary for such a mechanic to determine the degree of mis-alignment and to advice the automobile owner of any difficulty and as to what steps should be taken to correct the situation. The presence of such an operator at an alignment station means that the cost of such a determination has always been quite high. "Toe in" is defined as the distance that the front of the front wheels are closer together than the rear of the front wheels, while "toe out" is the distance that the front of the front wheels are further apart than the rear of the front wheels. "Toe in" is considered the most serious tire wearing angle of the various difficulties of wheel setting. Tire wear due to "toe in" appears as a feather-edged scuff along the face of both tires. However, it has been found to be true that a little too much "toe in" will result in wear appearing on the outside of the right front tire only. Conversely, a little too much "toe out" will result in wear appearing on the inside of the left front tire only. In any case, this difficulty in wheel alignment is sometimes an indication of other difficulties and can be very dangerous to the automobile operator and may cause him to become involved in an accident. However, because of the expense of having the wheel alignment determined, particularly because of the presence of the mechanic and the need for his advice, automobile drivers hesitate to have their front wheel alignment checked as often as seems to be dictated by the need for safety in driving. These and other difficulties experienced with the prior art devices have been obviated in a novel manner by the present invention.

It is, therefore, an outstanding object of the invention to provide an automobile wheel alignment apparatus capable of operation solely by the owner of the automobile and without the need for advice from a skilled mechanic.

Another object of this invention is the provision of an alignment apparatus which will advise the user by an audible speaking record of the degree of misalignment, the cause thereof, and the nature of the adjustments which should be made to his front end steering apparatus.

A further object of the present invention is the provision of an alignment apparatus which may be operated by a coin.

It is another object of the instant invention to provide an automobile wheel alignment apparatus having a multiple contact switching arrangement for connection to a record player or the like wherein means is provided to assure that the automobile-actuated switching means rests completely upon the closest switching contact to avoid arcing and burning of switch contacts.

It is a further object of the invention to provide an automobile wheel alignment apparatus whose operation may be started by a coin used by the automobile operator and which, during the measurement of wheel alignment, operates a multiple contact switching apparatus for bringing into operation an audible signal distinctive of the particular degree of misalignment involved.

With these and other objects in view, as will be apparent to those skilled in the art, the invention resides in the combination of parts set forth in the specification and covered by the claims appended hereto.

The character of the invention, however, may be best understood by reference to one of its structural forms, as illustrated by the accompanying drawings in which:

FIG. 1 is a perspective view of apparatus embodying the principles of the present invention;

FIG. 2 is a skeletonized, somewhat schematic view of a portion of the apparatus;

Figure 3:
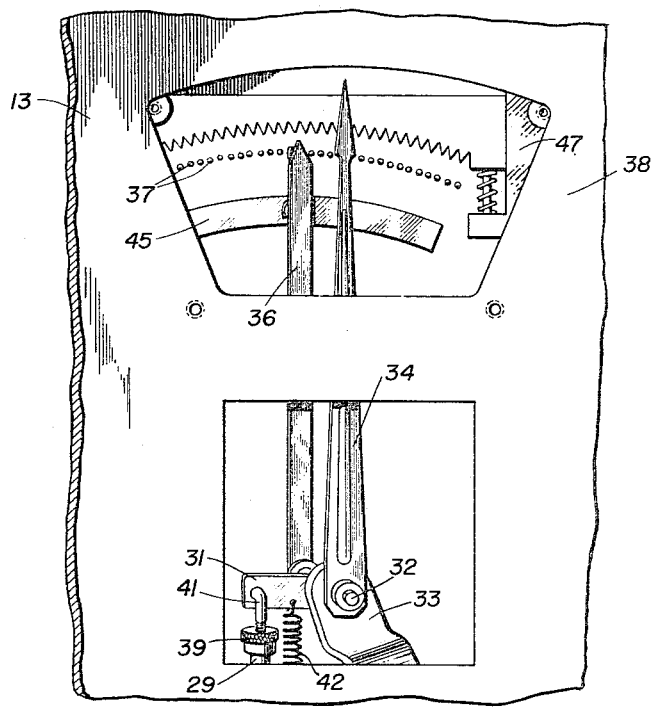
FIG. 3 is an enlarged front elevational view of a selector mechanism forming part of the apparatus.

Referring first to FIG. 1 wherein are best shown the general features of the invention, the automobile wheel alignment apparatus, indicated generally by the reference numeral 10, is shown as consisting of a coin-operated switch 11, a gauge 12, a selector 13, and an indicator 14. As is evident in FIGS. 1 and 2, the gauge 12 consists of a slightly raised sheet metal platform 15 having two slots 16 and 17 spaced a distance commensurate with the width of the average automobile. Extending upwardly through the slot 16 is a bar 18 having a saw-toothed upper edge; a similar bar 19 extends through the slot 17 slightly above the top surface of the platform 15. The bar 19 is supported below the platform 15 to slide sideways only in the slot and has its intermediate portion pivotally attached to a lever 21. This lever is pivoted in its central portion to a fixed portion of the platform and has its other end connected to a horizontal actuating bar 22. This bar is mounted in sliding members to be capable of horizontal sliding movement only under the platform 15. The bar 18 is also mounted below the platform to be capable of lateral sliding movement only and has its intermediate portion attached to one end of a vertical lever 23. This lever is pivotally attached to the platform in its central portion and has its other end connected through a horizontal transverse connecting rod 24 to a horizontal actuating bar 25 which is mounted for horizontal sliding movement only under the platform 15. The actuating bars 22 and 25 extend laterally until they underlie the selector 13. That end of the bar 22 is connected to a vertical leg of a bell crank 26 whose central portion is pivoted to a portion of the platform 15 and whose horizontal leg is pivotally attached to one end of a generally horizontal transverse bar 27. Similarly, the end of the actuating bar 25 which underlies the selector 13 is attached to a vertical leg of a bell crank 28 whose intermediate portion is pivoted to the underside of the platform 15 and whose horizontal leg is pivotally connected to the other end of the transverse bar 27. To the center of the bar 27 is pivotally attached a vertical rod 29.

Returning to FIGS. 1 and 2, it can be seen that the gauge 12 is provided with an automobile-operated treadle 69 which is pivotally mounted on the top surface of the platform 15 to be engaged by the automobile as it strikes the platform. This treadle is pivotally mounted and is provided with a rod 71 extending horizontally over the surface of the platform. The rod is attached to a horizontal bar 72 which lies on the top surface of the platform 15 and is pivotally attached thereto at one end by means of a vertical pivot pin 73. The other free end of the bar 72 is movable to strike the reset switch 63 on occasion. The free end of the bar 72 is also provided with a vertical pin 74 which extends downwardly through a transverse slot in the platform 15 to a T-member 75. This T-member is generally flat and arranged horizontally and is provided with two slots 76 and 77, one on each arm of the T. The bar 22 is provided with a vertical pin 78 which extends vertically upwardly through the slot 76, while the actuating bar 25 is similarly provided with a vertical pin 79 which extends upwardly through the slot 77. The edges of the slots are formed with inclined edges which act as cams on the pins 78 and 79. The net result of the lateral movement of the rod 71 and the pivotal movement of the bar 72, is that lateral movement of the T-member 75 takes place. This operates through the inclined edges of the slots 76 and 77 to move the actuating bars 22 and 25 horizontally to a neutral position carrying the bars 18 and 19 with them, so that the machine is reset for zero. A spring is associated with the rod 71 to return the reset apparatus to the original condition after the automobile leaves the gage.

The upper end of the vertical rod 29 is pivotally attached to one end of a horizontal lever 31, the other end of which is keyed to a pivot pin 32 suitably carried in bearings and in a support bracket 33. To one end of the pin 32 is keyed a visual indicating needle 34 which operates on a printed scale 35 mounted on the front of the housing of the selector 13. Keyed to the other end of the pivot pin 32 is a switching arm 36 operating over a series of switch contacts 37, as will be more fully described hereinafter.

Referring now to FIG. 3, it can be seen that the selector 13 consists of a housing 38 which is in the form of an elongated vertical sheet metal box carrying within it the operating elements of the selector. The bracket 33 is welded to the front of the housing 38 and extends rearwardly to operate as one support for the pivot pin 32. The rod 29 is made of adjustable length by providing its upper end with a threaded nut 39 which is engaged by a threaded hook 41, this hook having a horizontal upper portion which engages an aperture in the lever 31 for pivotal action. A coil spring 42 extends between the outer end of the lever 31 and the bottom of the rod 29 to cause the needle 34 and the switching arm 36 to occupy central positions when not otherwise urged away from such a central position. The arm 36 is provided with a metallic contact 43 adapted to engage the switch contacts 37 and with an electrical lead 44 adapted to engage at all times an arcuate grounding bar 45 over which the arm slides. Mounted in the housing 38 immediately above the arm 36 is a toothed bar 45 whose teeth are formed on an arc corresponding to the arc over which the arm travels as it rotates with the pivot pin 32. Each tooth is so located as to have its point immediately between a pair of the switch contacts 37. This bar is slidably mounted for vertical movement in guides 46 and 47. The bar 45 is provided adjacent the guide 46 with a vertical rod 48 which slides in an aperture in a bracket 49 attached to the guide; a coil spring 51 extends between the bracket 49 and the bar 45. Similarly, at the other end of the bar adjacent the guide 47 it is provided with a vertical rod 52 which slides through a bracket 53 mounted on the guide 47 and a coil spring 54 extends between the bracket 53 and the bar 45. The bar is, therefore, resiliently biased to an upper position.

Located in the upper portion of the bar 45 is the plunger 55 of a solenoid 56 having an actuating coil 57. The upper end of the plunger 55 is provided with a platen 58 adapted to engage, on occasion, a switch 59.

The apparatus is connected to a source 61 of alternating current electricity. This source may furnish 120 volt, 60-cycle A.C. or, as would be better practice, it may furnish a 45-volt, 60-cycle A.C. coming from a transformer forming a portion of the indicator 14. One side of the source 61 is connected through a line 62 to one side of the coil 57 of the solenoid 56. The other side of the coil 57 is connected through a reset transfer switch 63, a pressure switch 64 (see FIG. 1), and the coin-operated switch 11 to the other side of the source 61 which, for the purposes of convenience, will be considered the "ground" side. The apparatus is provided with a series of relays 65, one for each of the switch contacts 37. Each of the switch contacts is connected to the coil of its relay and the other side of the relay coils are all connected together through a line 66 to the "ground" side of the electrical source 61. Furthermore, one side of the normally-open switches of the relay 65 is connected through a line 67 to the line 66 and to ground. The other side of each of these relay switches is provided with a slide surface for engagement by a feeler 68 whose construction and purpose will be explained more fully hereinafter.

Figure 4:
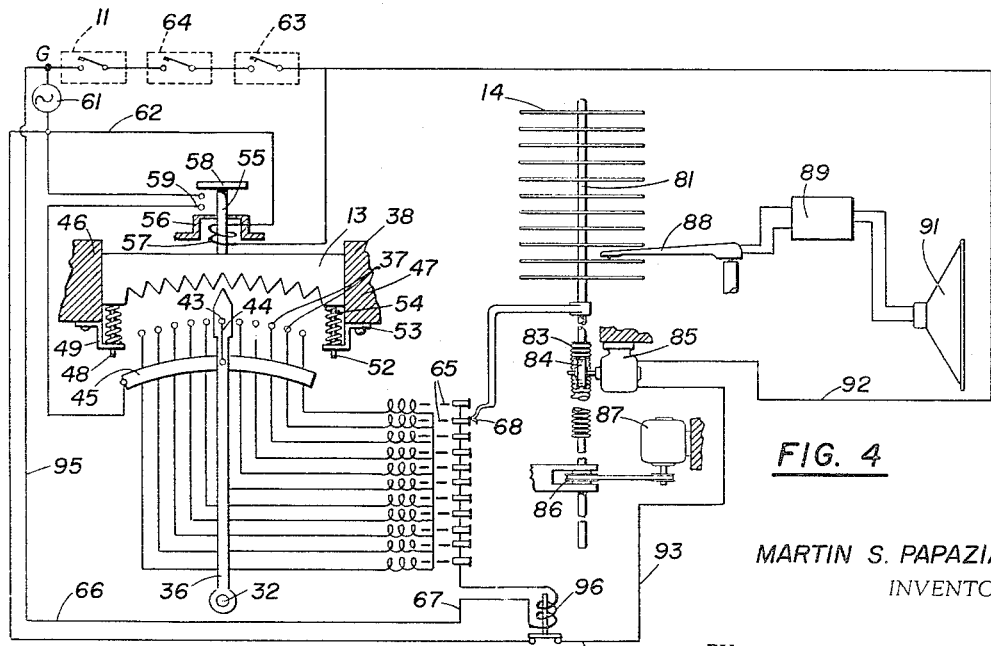
FIG. 4 is a generally schematic electrical diagram of the apparatus.

Referring now to FIG. 4, it can be seen that the indicator 14 is a form of coin-operated record player and consists of a vertical shaft 81 on which are mounted a plurality of disk records 82. Each record is provided with a message informing the user of the apparatus of the state of alignment of his front wheels, the cause of any mis-alignment, the degree of danger therein, and of the action which he should take to assure that the fault in mis-alignment has been corrected. This would be the sort of a device that a skilled wheel alignment man would give him after making measurements of alignment in the usual way. The shaft 81 is capable of moving vertically by means of a rack 83 formed on its surface, which rack is engaged by a pinion gear 84 mounted on the horizontal shaft of a motor 85. The shaft 81 is keyed to but is slidable vertically relative to a horizontal pulley 86 which is drivingly connected to a motor 87. As the shaft 81 moves up and down, it carries with it the feeler 68; the feeler moves over the contact surfaces of the non-grounded sides of the switches of the relay 65 engaging each in turn as it moves upwardly. Associated with the indicator is a record-playing arm 88 connected through an amplifier 89 to a loud speaker 91.

One side of the motor 85 is connected by a line 92 to the "ground" side of the electrical source 61. The other side of this motor is connected by a line 93 to the bottom of the shaft 81 where it makes a substantial electrical connection. The feeler 68 is electrically attached to the shaft 81 and makes electrical contact, as has been stated, with the non-grounded side of the contact switches of the relays 65.

The operation of the apparatus will now be readily understood in view of the above description. The automobile operator drives his automobile toward the platform 15, approaching it from the side at which is mounted the coin-operated switch 11. He inserts a coin in the apparatus, thus closing the switch 11 and rendering the apparatus ready for operation. He moves his car forward toward the platform and the left-hand wheel strikes the treadle 69 resetting the apparatus because of horizontal movement of the rod 71. Not only is this done, but at the same time the reset switch 63 is closed. As the car proceeds over the surface of the platform 15 the left wheel engages the bar 18, while the right-hand wheel engages the bar 19. As the wheel rolls over these bars, any sideways component of movement of the wheel surface due to toe in" or "toe out" will cause that particular bar to move laterally and will operate through the respective actuating bars 22 and 25 to adjust the aspect of the bar 27. The bar 27 serves as a mechanical summation of the movements of the bars 18 and 19 and the resultant setting operates on the vertical rod 29 to adjust the angularity of the pivot pin 32. This angularity will be an amount equal to the "toe in" or the "toe out" between the two wheels of the automobile. This will not only be visually indicated by means of the needle 34 and the scale 35 but the arm 36 will be moved over the contacts 37 by the amount that the needle 34 moves. The pointed upper end of the arm 36 underlies the toothed bar 45 in a position to which it has been set by the movement of the bars 18 and 19. As the automobile proceeds even further, eventually, the front wheels strike the pneumatic switch 64 and close it also. This means that all three switches 11, 63, and 64 are now closed, so that current can pass through these switches, through the coil 57 and the line 62 to the other side of the electrical source 61. The coil 57 being energized operates on the solenoid plunger 55 to throw it downwardly. This carries the bar 45 downwardly. Since the point of the arm 36 must necessarily lie to one side or another of the point of a tooth, it will be forced deeply into the notch on either side of that tooth, depending on which side of the point of the tooth the pointed end of the arm resides. The net result of all this is that the arm will be moved slightly to the right or the left of the position that it occupied because of the movement of the bars 18 and 19. The switch contacts 37 are located relative to these notches so that, irrespective of which notch the arm 36 resides in, it lies fully and in complete engagement with the particular switch contact 37 underlying that notch. There is no danger, therefore, of merely partial engagement of the contact 43 with one of the contacts 37 and a clear indication is assured.

In the preferred embodiment, the mechanical arrangement of the apparatus is such that the movement of the arm 36 from one notch to another or from one contact to a contact immediately adjacent to it indicates 1/64th of an inch in misalignment, so that it can be seen that the apparatus is very accurate. With the contact 43 of the arm 36 completely engaging one of the contacts 37, an electrical path takes place, since at this point in time the platen 58 has now closed the switch 59. This electrical path takes place from the "hot" side of the electrical source 61 to the switch 59, along a line 95 connecting the switch 59 to the bar 45, along the bar and through the lead 45 to the contact 43. The power continues from the contact 43 to the particular contact 37 with which it is engaged and then through the coil of one of the relays 65. The result will be that, so far as that particular relay is concerned, its normally-open contact switch will be closed. The closing of the three switches 11, 63, and 64 has caused a complete circuit through the line 92 so that the motor 85 is energized. With the record-playing arm 88 out of the way, the shaft 81 moves vertically carrying the records 82 with it. The feeler 68 passes over the ungrounded sides of the switches of the relays 65 one after another until it reaches the one whose contact switch is closed because its coil is energized. When it reaches this relay, the motor 85 will be grounded and the vertical movement of the shaft 81 will stop. Since the line 93 is also connected through a line 94 to the "hot" side of the electrical source 61, this shorting of the line 93 through the relays 65 causes the motor 85 to stop. Then, in the usual way, the record player arm 88 will move inwardly to play the record, which is continuously rotated by the motor 87 operating through the pulley 86. If desired, a suitable means such as a relay 96 may be used in the well-known manner also to disconnect the motor from the "hot" side of the electrical source at this time so that the wire 94 will not heat up. It can be seen, therefore, that by this method the contact 43 on the arm 36 engages a switch contact 37 commensurate with the degree of mis-alignment of the automobile and selects a particular record 82 to be played. This record has a special message to go along with that degree of mis-alignment.

It can be seen, then, that this apparatus provides for the measurement of the alignment of an automobile by the automobile owner himself without the necessity of an attendant or mechanic being present. He simply drops the coin in the coin-operated switch 11 and drives his automobile over the platform 15. After he has done this, a record will play and tell him of the degree of misalignment and what he must do about it. The record will also describe a dangerous condition that should be corrected. It can be seen, then, that for a small price the automobile owner will be able to determine whether his automobile front end is in a dangerous condition. This is particularly important where he has just driven through a deep hole in the road, or something of that nature, which might very well have knocked his front wheels into a dangerous condition of mis-alignment. The normal automobile operator would know that it was possible that his front end was out of alignment and in a dangerous condition, but would hesitate to take the time or to spend the money to go to an ordinary wheel alignment shop. However, he would be willing to spend a small amount of money to make use of the present apparatus to determine whether anything had happened to his wheel alignment.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. Automobile wheel alignment apparatus, comprising
   (a) a gage consisting of two bars over which the automobile passes to cause a movement of the bars proportional to the amount of mis-alignment of the wheels,
   (b) a coin-operated switch located on one side of the gage,
   (c) a reset switch located on the said one side of the gage,
   (d) a selector mechanically connected to the bars to actuate a swingable arm which occupies a position dictated by the said movement of the bars, the selector having a plurality of switch contacts arranged in an arc for contact successively by the movable member, the arm having a pointed free end, the selector having a toothed bar which moves toward the pointed end of the arm to move it slightly, if necessary, into complete registry with one of the switch contacts,
   (e) an indicator having a plurality of records, each bearing a distinctive message, one of the records being rendered operative when the movable member occupies a position corresponding to that one record, and
   (f) a pressure-operated transfer switch located on the other side of the gage to render the indicator operative after the automobile has passed over the gage, 2. Automobile wheel alignment apparatus, comprising
   (a) a gage consisting of two bars over which the automobile passes to cause a movement of the bars proportional to the amount of mis-alignment of the wheels,
   (b) a coin-operated switch located on one side of the gage for operation by the driver of the automobile before the front wheels reach the gage,
   (c) a reset switch operative to return the bars to zero mis-alignment position located on the said one side of the gage for engagement by the front wheels before they arrive at the bars,
   (d) a selector mechanically connected to the bars to actuate a swingable arm which occupies a position dictated by the said movement of the bars, the selector having a plurality of switch contacts arranged in an arc for contact successively by an electrical contact on the movable member, the arm having a pointed free end, the selector having a toothed bar which moves toward the pointed end of the arm to move it slightly, if necessary, into complete registry with one of the switch contacts,
   (e) an indicator having a record corresponding to each switch contact, each record bearing a distinctive message, one of the records being rendered operative and playing into a loudspeaker when the movable member occupies a position corresponding to that one record, and (f) a pressure-operated transfer switch including a hose located on the other side of the gage to render the indicator operative after the automobile has passed over the gage.

3. Automobile wheel alignment apparatus, comprising
(a) a gage over which the automobile passes giving a signal proportional to the amount of mis-alignment of the wheel,
(b) a selector receiving the signal and having a movable member which occupies a position dictated by the said signal,
(c) an indicator having a plurality of distinct signalling members, one of which may be rendered operative when the movable member occupies a position corresponding to that one signalling member, and
(d) a coin-operated switch rendering the said one of the signalling means operative in accordance with position of the movable member, wherein the gage consists of two bars which are engaged by the front wheels of the automobile and are moved an amount commensurate with the degree of mis-alignment, wherein a reset switch is located at the said one side selector to actuate the movable members, wherein the selector is provided with a plurality of switch contacts arranged in an arc to be contacted successively by the movable member, wherein the signalling members are records carrying a distinct message to be played through a loud speaker in accordance with the position of the movable member of the selector, wherein the movable member consists of an arm pivotally mounted at one end and pointed at the other end, wherein means is provided for locking the said arm in a pre-determined position closely related to the first-mentioned position, wherein the coin-operated switch is located on one side of the gage, wherein a reset switch is located at the said one side of the gage, wherein a pressure-operated transfer switch is located at the other side of the gage, and wherein the conditioning of the switches in a selective manner causes the indicator to be operative.

References Cited by the Examiner
UNITED STATES PATENTS

| | | | |
|---|---|---|---|
| 1,883,180 | 10/1932 | Weaver | 33—203.14 X |
| 1,890,218 | 12/1932 | Duby | 33—203.14 |
| 1,913,511 | 6/1933 | Reynolds | 73—170 X |
| 1,971,388 | 8/1934 | Scruby | 73—122 |
| 1,988,327 | 1/1935 | Musselman | 33—203.14 X |
| 2,005,923 | 6/1935 | Wilcox | 274—10 |
| 2,559,796 | 7/1951 | Rath | 346—17 |
| 2,598,599 | 5/1952 | Pleasance | 33—203.13 |

LEONARD FORMAN, *Primary Examiner.*

ISAAC LISANN, ROBERT L. EVANS, ROBERT B. HULL, *Examiners.*

WILLIAM D. MARTIN, JR., *Assistant Examiner.*